(12) United States Patent
Ertl

(10) Patent No.: US 7,931,327 B2
(45) Date of Patent: Apr. 26, 2011

(54) VEHICLE HAVING AT LEAST ONE TAILGATE

(75) Inventor: Harald Ertl, Eichenau (DE)

(73) Assignee: Cadea Gesellschaft für Anwendung und Realisierung Computerunterstützter Systeme mbH, Eichenau (DE)

( * ) Notice: Subject to any disclaimer, the term of this patent is extended or adjusted under 35 U.S.C. 154(b) by 0 days.

(21) Appl. No.: 12/584,356

(22) Filed: Sep. 3, 2009

(65) Prior Publication Data

US 2010/0001543 A1   Jan. 7, 2010

Related U.S. Application Data

(63) Continuation of application No. PCT/EP2008/005498, filed on Jul. 4, 2008.

(30) Foreign Application Priority Data

Jul. 17, 2007   (DE) .................. 10 2007 033 281

(51) Int. Cl.
*B60J 5/10* (2006.01)

(52) U.S. Cl. .................. 296/146.8; 296/146.12; 296/50; 49/341

(58) Field of Classification Search ............. 296/146.12, 296/146.11, 146.8, 50–55; 49/339, 340, 49/341, 342, 343
See application file for complete search history.

(56) References Cited

U.S. PATENT DOCUMENTS

2006/0152029 A1   7/2006   Tomasson et al.
2008/0109995 A1   5/2008   Kuwajima et al.

FOREIGN PATENT DOCUMENTS

DE   10 2004 042 808 A1   6/2005
DE   10 2004 050 228 A1   4/2006
DE   10 2005 026 772 A1   12/2006

OTHER PUBLICATIONS

Search Report mailed Oct. 7, 2008 issued by the International Searching Authority in counterpart International Application No. PCT/EP2008/005498 (2 pages).
English translation of Paragraph 2, 15, 27, 28 and Claims 1-7 of DE 10 2004 042 808 A1, published Jun. 16, 2005 (4 pages).

*Primary Examiner* — Glenn Dayoan
*Assistant Examiner* — Melissa A Black
(74) *Attorney, Agent, or Firm* — Robert P. Michal; Lucas & Mercanti, LLP

(57) ABSTRACT

A vehicle includes at least one tailgate defining a door plane, wherein the tailgate is attached to the vehicle chassis in a jointed fashion by at least one multiple hinge having at least three pivot axes offset from one another and at least two pairs of pivotally connected hinge arms, of which a first hinge arm is pivotally connected to the vehicle chassis and a second hinge arm is pivotally connected to the tailgate. The multiple hinge is associated with a drivetrain controlling the motion of the hinge arms in the pivot axes. The door plane is moved along a predetermined motion path when the tailgate travels from a closed position, in which the tailgate spans a closed plane, to an open position, in which the tailgate spans an opening plane. The motion path of the door plane includes rotary and translational components, and the closed plane forms an angle to the opening plane in the range from 70° to 110°, preferably about 90°.

13 Claims, 3 Drawing Sheets

US 7,931,327 B2

VEHICLE HAVING AT LEAST ONE TAILGATE

CROSS-REFERENCE TO RELATED APPLICATION

This application is a Continuation Application of PCT/EP2008/005498, and claims priority from International Application PCT/EP2008/005498 filed Jul. 4, 2008 and German Application DE 10 2007 033 281.7 filed Jul. 17, 2007, the entire disclosure of each of which is incorporated herein by reference.

FIELD OF THE INVENTION

The present invention relates to a vehicle having at least one tailgate attached to the vehicle by means of a suspension.

BACKGROUND OF THE INVENTION

A similar vehicle and a similar suspension for a vehicle side door are known from DE 10 2004 042 808 A1. The suspension described therein comprises an articulated arm system including at least two bending-resistant articulated arms interconnected via a joint, of which a first articulated arm is connected via a joint to a carrier fastened to the chassis frame, and a second articulated arm is connected with its free end via a joint to a support element fastened to the door. The articulated arm system has assigned thereto a gear train with transmission elements for the parallel movement of the door between a closed position and a front or rear opening position. With this suspension the door is first moved away from the vehicle for a short time during the opening operation and is then guided along in parallel with the side of the vehicle. Hence, the suspension only allows for a parallel displacement of the vehicle door. In some cases, e.g., in tailgates of vehicles or also in vehicles with a short tail, the side doors of which are shifted rearwards, i.e., in those vehicles in which the doors in the opened state would project far beyond the vehicle laterally or rearwards, such a parallel displacement is unwanted.

SUMMARY OF THE INVENTION

It is therefore the object of the present invention to provide a vehicle of the aforementioned type that exhibits an improved design of the door suspension and door opening, respectively, above all for tailgates.

For this purpose it is provided according to the invention that the vehicle comprises at least one tailgate defining a door plane, said tailgate being attached to the vehicle chassis in a jointed fashion by means of at least one multiple hinge having at least three pivot axes offset from one another and at least two paired, pivotally interconnected hinge arms, of which a first hinge arm is pivotally connected to the vehicle chassis and a second hinge arm is pivotally connected to the tailgate, the multiple hinge being associated with a gear train controlling the hinge motion of the hinge arms in the pivot axes, whereby the door plane is moved along a predetermined motion path when the tailgate is moved from a closed position, in which the tailgate spans a closed plane, into an open position, in which the tailgate spans an opening plane, the motion path of the door plane comprising rotary and translational components, and the closed plane enclosing an angle with the opening plane in the range from 70° to 110°, preferably about 90°.

As a result, the tailgate while being opened performs not only a parallel movement, but is also pivoted. Consequently, the opened tailgate no longer projects far beyond the vehicle, but is laterally arranged in parallel with the vehicle side. The vehicle will then have a large loading opening.

According to a variant the length of the hinge arms is fixed such that the tailgate is arranged in the open position at a lateral distance next to a side of the vehicle. In the open position the tailgate is disposed completely next to the vehicle, whereby a rearward viewing onto the vehicle is not obstructed in any way. Taillights, warning lights, flashers, and other lights are thus not concealed by the opened tailgate.

According to a preferred configuration the tailgate is arranged in the open position approximately up to half the door width next to the vehicle. This makes the opening curve or motion path of the door plane flatter. Both during opening of the tailgate and in the open position of the tailgate the space needed at the rear, behind the vehicle, is smaller.

In an expedient embodiment, the first hinge arm may be connected on a first pivot axis to the vehicle chassis and the length of the first hinge arm corresponds at least to the depth of the tailgate. As a result, the tailgate can be moved out of the door plane in an easy way. In the open position the tailgate can easily be arranged laterally next to the vehicle.

In a further expedient embodiment, it may be provided that the second hinge arm is connected on a second pivot axis to a rigid carrier of the tailgate, and the distance between the second pivot axis and the connection of the first hinge arm to the vehicle chassis corresponds to about ⅔ of the width of the tailgate. It can thereby be ensured on the one hand that the tailgate in the open position is arranged at an adequate lateral distance from the side of the vehicle and on the other hand the torque acting on the multiple hinge gets thereby smaller.

In a further variant, the second hinge arm may be longer than the first hinge arm. This makes it possible that the tailgate is arranged in the open position laterally next to the vehicle and does not project too much rearwards beyond the vehicle tail. The lateral distance of the tailgate to the vehicle can be varied by changing the length of the second hinge arm.

Expediently, the gear train is configured such that the gear ratio between the second hinge arm and the rigid carrier of the tailgate to the gear ratio between the vehicle chassis and the first hinge arm and to the gear ratio between the first hinge arm and the second hinge arm is negative. Therefore, when the tailgate is opened, the rotational angle between the rigid carrier and the second hinge arm is decreasing, while the rotational angle between the vehicle chassis and the first hinge arm and between the first hinge arm and the second hinge arm is increasing. The rigid carrier is thereby rotated in a direction opposite to the two hinge arms when the tailgate is opened. The tailgate is moved next to the vehicle in such a way that it is arranged in parallel with the vehicle side in the open position. It is thereby easier to adjust the lateral distance between the attachment of the multiple hinge to the vehicle chassis and the position of the tailgate in the opened state.

In a further advantageous embodiment it may be provided that the gear train is configured such that the gear ratio between the vehicle chassis and the first hinge arm exactly corresponds to the gear ratio between the first hinge arm and the second hinge arm and exactly to the absolute value of the gear ratio between the second hinge arm and the rigid carrier of the tailgate. Thus the first hinge arm is always displaced by the same angle as the second hinge arm whereas the rigid carrier of the tailgate is adjusted by the same angle, but in opposite rotational direction. As a result, the gear train can be configured in a very simple way.

Preferably, in the open position of the tailgate an angle $\alpha'$ spanned between the vehicle chassis and the first hinge arm is about 90°, an angle $\beta'$ spanned between the extension of the first hinge arm and the second hinge arm is about 90°, and an angle γ spanned between the extension of the second hinge arm and the rigid carrier of the vehicle chassis is about 0°. With this suitable selection of the angles in the open position it is easily achieved that the tailgate is arranged in the open position in parallel with the side of the vehicle and encloses an angle of about 90° with the closed plane. Since the opening angles have the same gear ratio or the same magnitude of the gear ratio, the gear train can be designed in a simple way.

Preferably, the gear train is formed by toothed belt connections. This accomplishes a slip-free connection of low friction and low noise emission.

However, it may also be provided that the gear train comprises toothed wheel gears and toothed belt connections. The toothed wheel gears permit a high loadability and require little space.

In a further configuration the tailgate may be connected via two multiple hinges with associated gear trains to the vehicle chassis. Higher loads can thereby be carried, which is particularly advantageous in the case of large and heavy tailgates.

Expediently, at least one motor can be assigned to the at least one multiple hinge with the gear train. The tailgate can then be opened and closed via the motor; forces need no longer be exerted.

BRIEF DESCRIPTION OF THE DRAWINGS

Embodiments of the present invention will now be explained in more detail with reference to a drawing, in which.

DETAILED DESCRIPTION OF THE INVENTION

Figure 1:
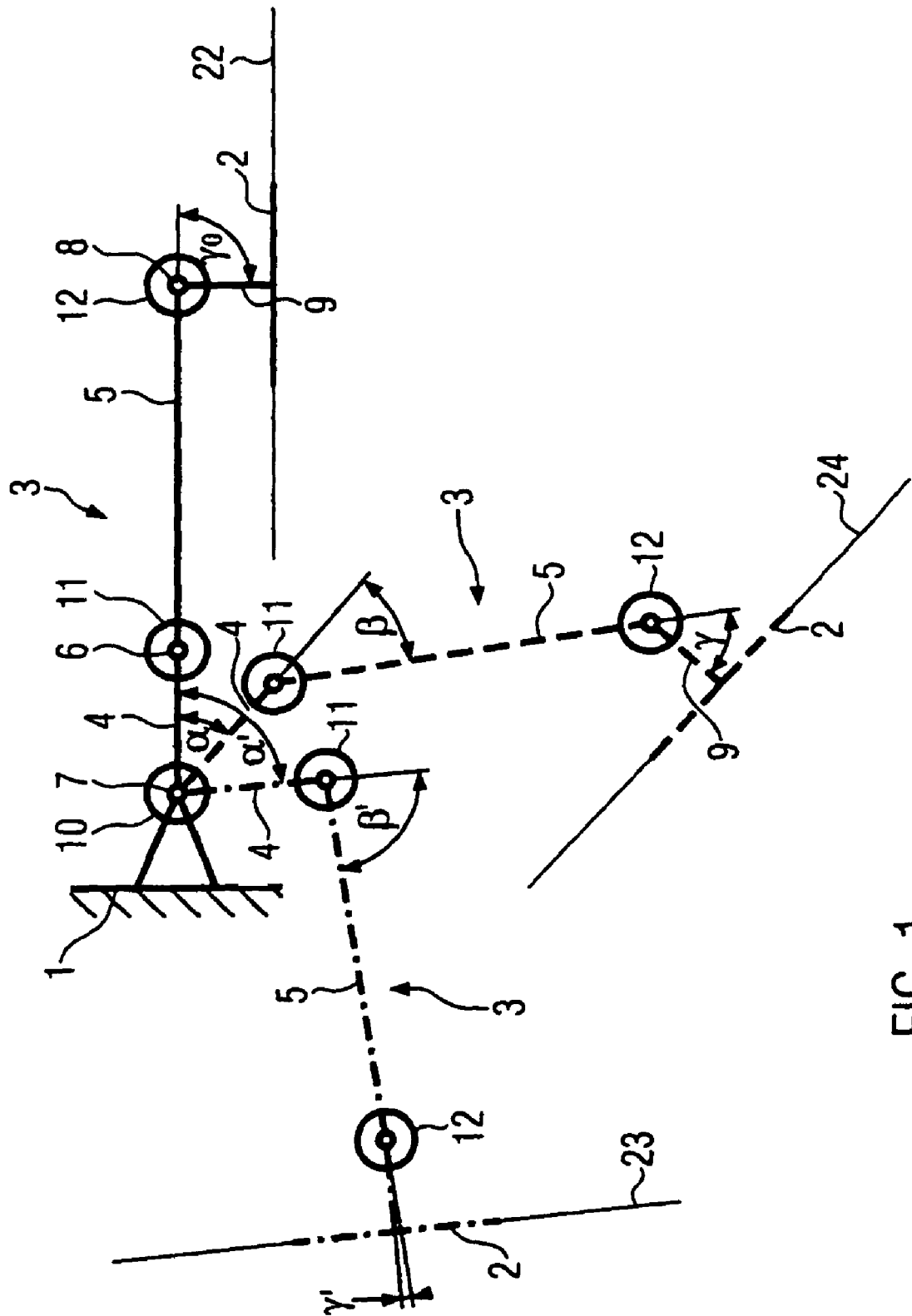
FIG. 1 is a schematic illustration of a tailgate in different positions.

FIG. 1 is a schematic view showing a tailgate 2 attached to a vehicle chassis 1, in different positions. The tailgate 2 is fastened via a multiple hinge 3 to the vehicle chassis 1. The tailgate 2 defines a door plane 24. In the illustration drawn with continuous lines, the tailgate 2 is closed and is positioned in a closed plane 22. The door plane 24 is then identical with the closed plane 22. In the illustration with broken lines the tailgate 2 is located in an intermediate position during the opening process. The door plane 24 encloses an angle with the closed plane 22. The illustration plotted with dash-dotted lines shows the tailgate 2 in a fully opened position, in which the tailgate 2 is located in an opening plane 23. The door plane 24 is thus identical with the opening plane 23 in this position.

The multiple hinge 3 comprises a first hinge arm 4 and a second hinge arm 5, which are rotatably interconnected on a pivot axis 6. The first hinge arm 4 is rotatably connected at its free end on a pivot axis 7 to the vehicle chassis 1. The second hinge arm 5 is rotatably connected at its free end on a pivot axis 8 to a rigid carrier 9 fastened to the tailgate 2. However, it would also be conceivable to fasten the second hinge arm 5 via a rigid connection directly to the tailgate 2.

The pivot axes 6, 7, 8 have assigned thereto gear elements 10, 11, 12 forming a gear train. When the tailgate 2 is moved out of the closed position into the opening position, the door plane 24 is moved by the gear train along a predetermined motion path. The gear elements 10, 11, 12 are kinematically interconnected, so that the motion path of the door plane 24 is constant all the time. The motion paths of the individual components of the multiple hinge 3, and thus the motion path of the door plane 24, are set via the gear ratios of the individual gear elements 10, 11, 12.

Since the tailgate 2 is moved through a combination of rotation and displacement from the closed position into the open position, the closed plane 22 and the opening plane 23 enclose an angle. This angle is in the range of 70° to 110° and is preferably 90°. During opening the tailgate 2 is thus not only shifted in parallel, but is also pivoted.

Figure 2:
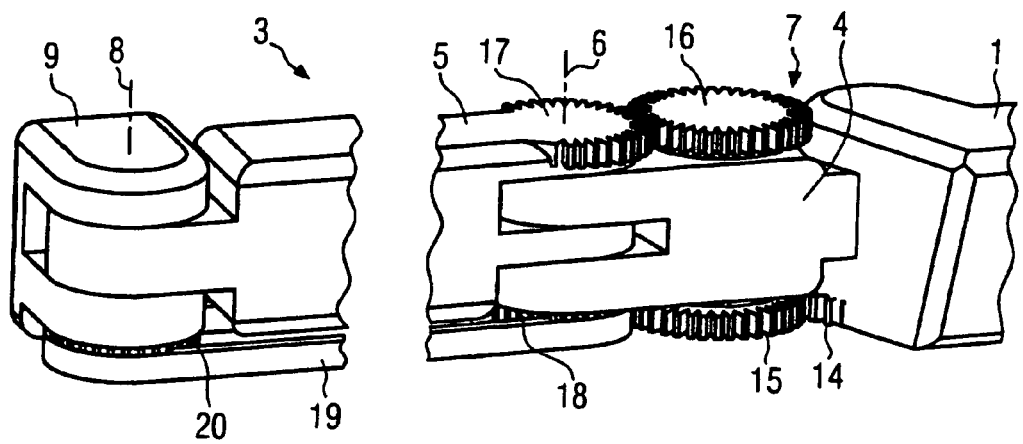
FIG. 2 shows an embodiment of a multiple hinge with associated gear train.

FIG. 2 is an enlarged perspective view showing the multiple hinge 3, wherein the second hinge arm 5 is not shown in its full length.

The first hinge arm 4 is rotatably supported on the pivot axis 7 in the vehicle chassis 1. To this end the vehicle chassis 1 has assigned thereto a toothed structure 14 on the pivot axis 7. On the hinge arm 4, a toothed wheel 15 is mounted, which engages into the toothed structure 14 of the vehicle chassis 1. The toothed structure 14 and the toothed wheel 15 form the gear element 10.

The first hinge arm 4 and the second hinge arm 5 are rotatably mounted with one another on the pivot axis 6. The gear element 11 is arranged on this pivot axis 6. The gear element 11 comprises a toothed wheel 16 arranged on the first hinge arm 4, and a toothed structure 17 arranged on the second hinge arm 5, the toothed wheel 16 and the toothed structure 17 meshing with each other and transmitting movements of the one hinge arm 4; 5 to the respectively other hinge arm 5; 4.

At its other end the second hinge arm 5 is rotatably supported on a further pivot axis 8 on the rigid carrier 9 of the tailgate 2. The pivot axis 8 has assigned thereto a further gear element 12. The gear element 12 comprises a toothed wheel 18 which is arranged on the second hinge arm 5 and which is connected via a toothed belt 19 to a toothed wheel 20 arranged on the rigid carrier 9, so that the second hinge arm 5 can be pivoted about the rigid carrier 9.

Figure 3:
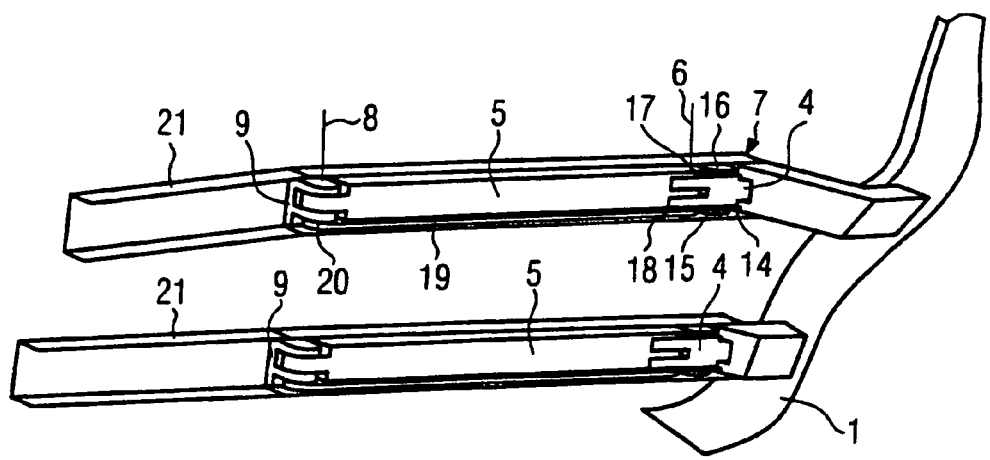
FIG. 3 is a perspective view of two superposed multiple hinges attached to the vehicle chassis.

FIG. 3 is a perspective view showing two superposed multiple hinges 3, in which the second hinge arm 5 is shown in its full length. The first hinge arm 4 is connected at one end to the vehicle chassis 1; the second hinge arm 5 is connected at one end to the rigid carrier 9, which is attached to an accommodating duct 21 assigned to the tailgate 2. As has already been described, the gear train is formed on the first pivot axis 7 by a toothed structure 14 assigned to the vehicle chassis 1 and by a toothed wheel 15 assigned to the first hinge arm 4, on the second pivot axis 6 by a toothed wheel 16 assigned to the first hinge arm 4 and by a toothed structure 17 arranged on the second hinge arm 5, and on the third pivot axis 8 by a toothed wheel 18 assigned to the second hinge arm 5 and by a toothed wheel 20 assigned to the rigid carrier 9, which are interconnected via a toothed belt 19. However, it is also conceivable that other mechanisms are used in the gear train, e.g. only toothed belts or also chains.

In the closed position of the tailgate 2, the multiple hinge 3 is arranged in the accommodating duct 21 of the tailgate 2. The stiffness of the tailgate 2 can be enhanced through the accommodating duct(s) 21. To this end additional struts may be mounted between the accommodating ducts 21. Preferably, the struts should be mounted on the upper accommodating duct at the place where the rigid carrier is arranged so as to absorb arising forces. Hence, the accommodating ducts 21 are interconnected via the struts and can therefore form the supporting structure of the tailgate 2. All of the essential elements, such as for instance the lock or the closing mechanism, are then mounted on the accommodating ducts 21. The forces arising on the tailgate 2 are absorbed and passed on, respectively, by the accommodating ducts 21 and the struts connecting the accommodating ducts. The visible outer skin of the tailgate 2 is thus only a casing. The tailgate 2 can thereby be implemented as a lightweight structure.

Figure 4:
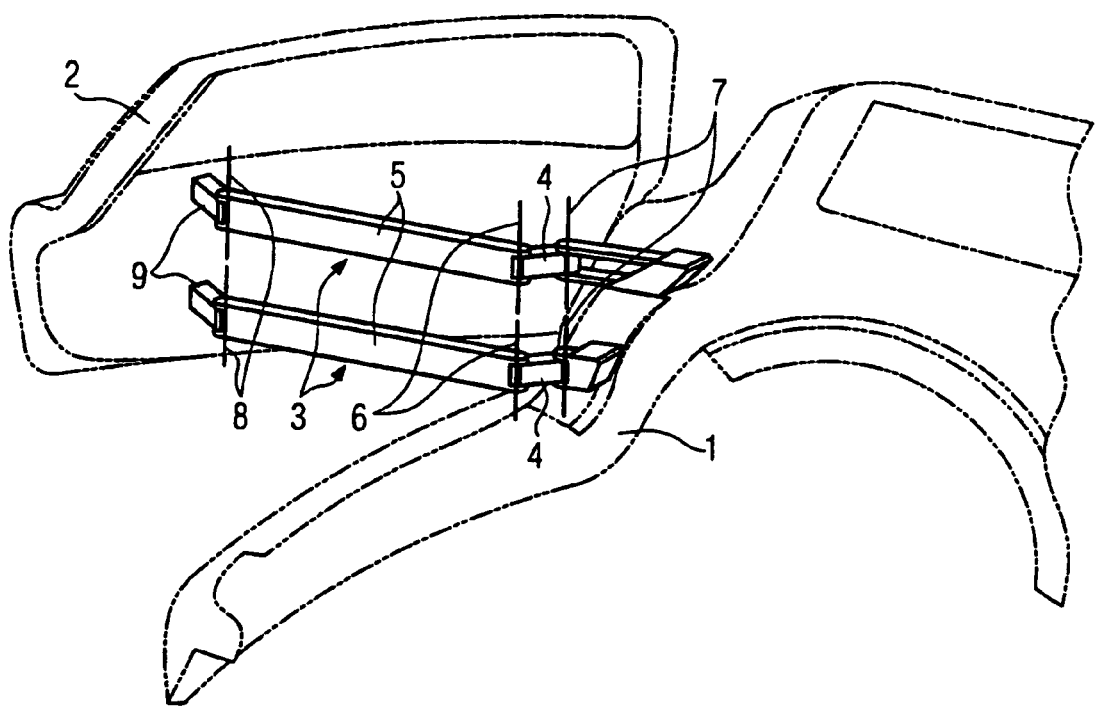
FIG. 4 shows the tailgate with two multiple hinges according to the invention.

FIG. 4 is a perspective view showing the tail portion of a vehicle according to the invention with a tailgate 2 arranged thereon. Both the tailgate 2 and the vehicle chassis 1 are only schematically shown in FIG. 4. The tailgate 2 is here connected via two multiple hinges 3 to the vehicle chassis 1. The multiple hinges 3 are of identical construction with respect to each other, each of the multiple hinges 3 comprising three pivot axes 6, 7, 8. However, it would also be conceivable to design the multiple hinges such that in each multiple hinge only two pivot axes are provided. The accommodating ducts for the multiple hinges are here not shown.

In FIG. 4, the tailgate 2 is being opened and is located in a central opening position.

The length of the hinge arms 4, 5 is defined such that the tailgate 2 is arranged in the open position at a lateral distance next to a side of the vehicle. The tailgate 2 is here arranged up to about half the door width next to the vehicle.

The multiple hinge 3 is preferably configured such that the second hinge arm 5 is longer than the first hinge arm 4 and also longer than the rigid carrier 9.

The length of the first hinge arm 4 corresponds here at least to the depth of the tailgate 2. The distance between the rigid carrier 9 of the tailgate 2 and the pivot axis 7, and the connection of the first hinge arm 4 to the vehicle chassis, respectively, is about ⅔ of the width of the tailgate 2.

Furthermore, it may be provided that a motor is arranged next to the vehicle chassis 1, the motor communicating with the gear train or with one of the gear elements 10, 11, 12, so that the tailgate 2 can be opened and closed by the motor.

The operation of the tailgate 2 and of the multiple hinge 3, respectively, will now be described in more detail with reference to FIGS. 1 to 4.

As has already been described, FIG. 1 shows various positions the tailgate 2 can assume. Continuous lines show the closed position in which the tailgate 2 is positioned in a closed plane 22. The dash-dotted lines show the open position in which the tailgate 2 is positioned in the opening plane 23. The tailgate 2 defines the door plane 24, which in the closed position of the tailgate 2 is identical with the closed plane 22 and which in the open position of the tailgate 2 is identical with the opening plane 23. When the tailgate 2 is moved from the closed position into the open position, the door plane 24 is moved by the gear train along a predetermined, always invariable motion path. The motion paths of the individual components of the multiple hinge 3, and thus the motion path of the door plane 24, are adjusted by the gear ratios of the gear elements 10, 11, 12 of the gear train. The gear train is here configured such that the motion path of the door plane 24 comprises rotary and translational components.

The opening operation of the tailgate 2 can e.g. be started in that a user operates a door handle and pulls the tailgate 2, and thus also the rigid carrier 9, to the outside. Since all components of the multiple hinge 3 are kinematically interconnected via the gear train, a movement of one of the components results in a movement of all of the other components in a predetermined way and the door plane 24 delineates the predetermined motion path.

Hence, the movement of the rigid carrier 9 is transmitted on the joint or pivot axis 8 via the associated gear element 12 to the second hinge arm. The movement of the second hinge arm 5, in turn, is transmitted via the pivot axis 6 and the associated gear element 11 to the first hinge arm 4, which then pivots along the pivot axis 7 and with the help of the gear element 10 about the vehicle chassis 1.

In the closed position of the tailgate 2, the first hinge arm 4 and the second hinge arm 5 form a straight line; the rigid carrier 9 encloses an angle $\gamma_0$ of 90° with the extension of the second hinge arm 5. After initiation of the door opening process, e.g. by operating a door handle or an automatic door opener, the tailgate 2 is moved outwards. The gear ratio of the gear element 12 is chosen such that the rigid carrier 9 is pivoted along the pivot axis 12 in such a way that the angle $\gamma$, which is spanned between the extension of the second hinge arm 5 and the rigid carrier 9, is decreasing. The movement of the rigid carrier 9 is transmitted via the gear element 12 to the second hinge arm 5. The gear elements 11, 12 are preferably configured such that the angle $\beta$ spanned between the first hinge arm 4 and the second hinge arm 5 is increasing to the extent the angle $\gamma$ is decreasing. The movement of the second hinge arm 5 is transmitted via the gear element 11 to the first hinge arm 4. In this instance, too, the gear elements 10, 11 are again configured such that the angle $\alpha$ spanned between an extension of the vehicle chassis 11 and the first hinge arm 4 is increasing to the same extent as does the angle $\beta$. This is made possible by pivoting the first hinge arm 4 on the pivot axis 7.

Since the motion path of the door plane 24 as defined by the gear elements 10, 11, 12 shows rotary and translational components, the tailgate 2 is moved in the opening process such that it is pivoted from the closed position, in which it is positioned in parallel with the vehicle tail, into an open position, in which the tailgate 2 is substantially arranged in parallel with the corresponding side wall of the vehicle chassis 1. As can be seen in FIG. 1, the angles $\alpha$ and $\beta$ in the closed position of the tailgate 2 are 0°; the angle $\gamma_0$ is 90°. In the illustrated open position the angles $\alpha'$, $\beta'$ are about 85°; the angle $\gamma'$ is about 5°. The gear train is thus configured such that the gear ratio on the pivot axes 6, 7 assumes the value 1 and on the pivot axis 8 the value −1. Hence, the gear ratio between the rigid carrier 9 of the tailgate 2 and the second hinge arm 5 has an opposite sign with respect to the gear ratio between the first hinge arm 4 and the second hinge arm 5 and the gear ratio between the first hinge arm 4 and the vehicle chassis 1; the absolute values of the gear ratios are identical. This has the effect that the angles $\alpha$ and $\beta$ are increasing when the tailgate 2 is opened, whereas the angle $\gamma$ is decreasing when the tailgate 2 is opened.

It is also conceivable that the gear ratio assumes other values, but attention must be paid that the gear ratio on the pivot axis 8, i.e., of the gear elements 12, has an opposite sign with respect to the gear ratios on the gear elements 10 and 11.

The invention claimed is:

1. A vehicle comprising at least one tailgate defining a door plane, said tailgate being attached to the vehicle chassis in a jointed fashion by means of at least one multiple hinge having at least three pivot axes offset from one another and at least two paired, pivotally interconnected hinge arms, of which a first hinge arm is pivotally directly connected to the vehicle chassis with spur gears having parallel axes, and a second hinge arm is pivotally directly connected to the tailgate, the first and second hinge arms being connected in series, the at least one multiple hinge being associated with a gear train controlling the hinge motion of the hinge arms in the pivot axes, whereby the door plane is moved along a predetermined motion path when the tailgate is moved from a closed position, in which the tailgate spans a closed plane, into an open position, in which the tailgate spans an opening plane, the motion path of the door plane comprising rotary and translational components, and the closed plane enclosing an angle with the opening plane in the range from 70° to 110°,~
 wherein the second hinge arm is connected on a pivot axis to a rigid carrier of the tailgate, and a distance between the pivot axis and the connection of the first hinge arm to the vehicle chassis corresponds to about ⅔ of the width of the tailgate.

2. The vehicle according to claim 1, wherein the length of the hinge arms is fixed such that the tailgate is arranged in the open position at a lateral distance next to a side of the vehicle.

3. The vehicle according to claim 1, wherein the tailgate is arranged in the open position approximately up to half the door width next to the vehicle.

4. The vehicle according to claim 1, wherein the first hinge arm is connected on a first pivot axis to the vehicle chassis and the length of the first hinge arm corresponds at least to the depth of the tailgate.

5. The vehicle according to claim 1, wherein the second hinge arm is longer than the first hinge arm.

6. The vehicle according to claim 1, wherein the gear train is configured such that the gear ratio between the second hinge arm and the rigid carrier of the tailgate to the gear ratio between the vehicle chassis and the first hinge arm and to the gear ratio between the first hinge arm and the second hinge arm is negative.

7. The vehicle according to claim 1, wherein the gear train is configured such that the gear ratio between the vehicle chassis and the first hinge arm exactly corresponds to the gear ratio between the first hinge arm and the second hinge arm and exactly to the absolute value of the gear ratio between the second hinge arm and the rigid carrier of the tailgate.

8. The vehicle according to claim 1, wherein in the open position of the tailgate an angle $\alpha'$ spanned between the vehicle chassis and the first hinge arm is about 90°, an angle $\beta'$ spanned between the extension of the first hinge arm and the second hinge arm is about 90°, and an angle $\gamma'$ spanned between the extension of the second hinge arm and the rigid carrier of the tailgate is about 0°.

9. The vehicle according to claim 1, wherein the gear train is formed by toothed belt connections.

10. The vehicle according to claim 1, wherein the gear train comprises toothed wheel connections and toothed belt connections.

11. The vehicle according to claim 1, wherein the tailgate is connected via two multiple hinges with associated gear trains to the vehicle chassis.

12. The vehicle according to claim 1, wherein the first and second hinge arms are rotatably mounted with one another on a pivot axis, the first hinge arm having a first gear element and the second hinge arm having a second gear element, the first and second gear elements operatively meshing with one another, and transmitting movements of one of the first and second hinge arms to the other of the first and second hinge arms.

13. The vehicle according to claim 1, wherein the closed plane enclosing an angle with the opening plane is preferably about 90°.

* * * * *